(12) United States Patent
Roy et al.

(10) Patent No.: US 9,232,489 B2
(45) Date of Patent: Jan. 5, 2016

(54) RECEIVER DESIGN FOR GEO-LOCATION AND/OR PHASE COHERENT PROCESSING

(71) Applicants: Dipak Roy, Ottawa (CA); Angsuman Rudra, Ottawa (CA)

(72) Inventors: Dipak Roy, Ottawa (CA); Angsuman Rudra, Ottawa (CA)

(*) Notice: Subject to any disclaimer, the term of this patent is extended or adjusted under 35 U.S.C. 154(b) by 152 days.

(21) Appl. No.: 13/935,872

(22) Filed: Jul. 5, 2013

(65) Prior Publication Data

US 2014/0010227 A1    Jan. 9, 2014

Related U.S. Application Data

(60) Provisional application No. 61/668,507, filed on Jul. 6, 2012.

(51) Int. Cl.
| | |
|---|---|
| H04L 7/00 | (2006.01) |
| G01S 3/16 | (2006.01) |
| H04Q 7/20 | (2006.01) |
| H04W 56/00 | (2009.01) |

(52) U.S. Cl.
CPC ............ *H04W 56/002* (2013.01); *H04W 56/00* (2013.01)

(58) Field of Classification Search
CPC ... H04W 56/00; H04W 56/002; H04W 16/20; H04L 9/0872; H04L 12/2834; H04L 41/5045
USPC ........................................................ 370/350
See application file for complete search history.

(56) References Cited

U.S. PATENT DOCUMENTS

| | | | |
|---|---|---|---|
| 5,887,176 A * | 3/1999 | Griffith et al. ................. 713/320 |
| 7,023,833 B1 * | 4/2006 | Aiello et al. ................... 370/348 |
| 7,257,182 B1 * | 8/2007 | Elliott et al. ................... 375/365 |
| 7,941,053 B2 * | 5/2011 | Dallesasse ..................... 398/139 |
| 2008/0150689 A1 * | 6/2008 | Chiu et al. ..................... 340/10.1 |
| 2009/0054075 A1 * | 2/2009 | Boejer et al. ................ 455/456.1 |
| 2010/0203832 A1 * | 8/2010 | Russell et al. ................ 455/41.2 |
| 2010/0271263 A1 * | 10/2010 | Moshfeghi .................... 342/378 |
| 2013/0002448 A1 * | 1/2013 | Makdissi ..................... 340/870.4 |
| 2013/0336656 A1 * | 12/2013 | Belansky et al. ............... 398/79 |

* cited by examiner

*Primary Examiner* — Curtis A Alia
*Assistant Examiner* — Vanneilian Lalchinthang
(74) *Attorney, Agent, or Firm* — Brion Raffoul

(57) ABSTRACT

A receiver system using commercially available super high-speed data converters that are able to directly digitize at multiple GHz sampling rates with sufficient accuracy to fit many radio applications. Unlike conventional receivers, no down converters or mixing stages are required. Instead it uses a bank of RF filters from which the desired RF filter, based on the frequency band of interest, is switched in. The frequency spectrum scan rate is very fast as the settling time for the simple RF front-end is small and the speed of RF switching is high. The filtered output is digitized at a multiple GHz sampling rate and all signal processing is done by FPGA or a combination of FPGA and/or a general-purpose processor.

15 Claims, 2 Drawing Sheets

RECEIVER DESIGN FOR GEO-LOCATION AND/OR PHASE COHERENT PROCESSING

TECHNICAL FIELD

The present invention relates to radio frequency circuitry and, more specifically, to methods and devices for geo-location using simple radio circuitry with high data sampling rates.

BACKGROUND OF THE INVENTION

The conventional super heterodyne receivers involve complex RF circuitry with multiple mixing stages each with its own oscillators. Aside from the inherent complexity, in applications where multiple physically separated receivers are required to operate in a synchronized fashion for geo-location or other coherent processing, phase matching RF circuitry and synchronizing ADC clocks across multiple receivers are difficult. The current practice for synchronizing multiple receivers is to tune RF circuitry through extensive calibration using known signal sources and to perform periodic disciplining of ADC clocks using GPS or other reference clock sources. This not only makes the operation cumbersome and expensive, it also tends to compromise the accuracy of geo-location as phase mismatch between multiple receivers cannot be fully compensated for.

SUMMARY OF INVENTION

The invention relates to a receiver system using commercially available super high-speed data converters that are able to directly digitize at multiple GHz sampling rates with sufficient accuracy to fit many radio applications. Unlike conventional receivers, no down converters or mixing stages are required. Instead it uses a bank of RF filters from which the desired RF filter, based on the frequency band of interest, is switched in. The frequency spectrum scan rate is very fast as the settling time for the simple RF front-end is small and the speed of RF switching is high. The filtered output is digitized at a multiple GHz sampling rate and all signal processing is done by FPGA or a combination of FPGA and/or a general-purpose processor. If the 10 Gigabit network or any other high speed data link is chosen to output data, unprocessed or raw ADC data can be directly transferred to a remote or co-located processing site, further simplifying the receiver design.

Many geo-location applications require remote processing of data from multiple receivers that must be closely synchronized for good measurement accuracy. The present invention leads to a simple receiver design making synchronizing multiple receivers significantly easier.

The present invention provides a simple receiver architecture that takes advantage of very fast analog-to-digital converters (ADCs). Instead of complex RF downconversion requiring multiple mixing stages, an incoming RF signal is sampled at a very high rate and digitized by the ADC, often at high GHz rates. The sampled signals are then digitally processed. This processing may be done on-site or remotely at a central location.

In a first aspect, the present invention provides A method for synchronizing a plurality of radio frequency receivers, the method comprising:
a) providing said plurality of radio frequency receivers, each one of said radio frequency receivers being equipped with an ultra high speed clock for clocking a reception of radio signals for said receivers;
b) providing said plurality of radio frequency receivers at a single location;
c) synchronizing clocks of said plurality of radio frequency receivers;
d) placing each of said plurality of radio frequency receivers in hibernation such that each radio frequency receiver's clock is operational and continues its clocking;
e) locating each of said plurality of radio frequency receivers at locations physically remote from each other.

In a second aspect, the present invention provides a system for receiving multiple wireless signals, the system comprising:
at least two radio frequency receivers for receiving said wireless signals and for digitizing wireless signals received, each of said at least two radio frequency receivers comprises an ultra high speed clock for controlling digitization of said wireless signals;
a central processing station controlling said at least two radio frequency receivers, said central processing station being physically remote from each of said at least two radio frequency receivers;
an ultra-high speed data link connecting said at least two radio frequency receivers and said central processing station;
wherein
said at least two radio frequency receivers receive said wireless signals, digitizes said wireless signals, and sends digitized wireless signals to said central processing station by way of said data link;
said ultra-high speed clock at each of said at least two radio frequency receives are synchronized with clocks for said other radio frequency receivers.

In a further aspect, the present invention provides a receiver system for receiving wireless signals, the receiver comprising:
a low noise amplifier for amplifying wireless signals received by said receiver system to result in an amplified signal;
a plurality of RF filters for receiving and filtering said amplified signal, each of said RF filters being for filtering and isolating at least one frequency band of said amplified signal, each of said RF filters producing an isolated signal;
a high speed analog to digital converter (ADC) for digitizing an isolated signal from one of said plurality of RF filters to result in a digitized signal, said ADC being for digitizing said isolated signal at a sampling rate of at least $(1 \times 10^9)$ samples per second;
a plurality of switches for coupling said plurality of RF filters with said ADC, said plurality of switches being configured such that a specific RF filter is coupled to said ADC when a specific switch is active;
wherein said digitized signal from said ADC is transmitted to a processing station by way of an ultra-high speed data link.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

The present invention relates to a receiver design using commercially available super high-speed data converters that are able to directly digitize at multiple giga samples per second with sufficient accuracy to fit many radio applications. Unlike conventional receivers, this approach does not require any down converters or mixing stages. Instead it uses a bank of RF filters from which the desired RF filter is switched-in based on the frequency band of interest. The frequency spectrum scan rate is very fast as the settling time for the simple RF front-end is small and the speed of RF switching is high. The filtered output is digitized at a multiple GHz sampling rates and all signal processing is done by FPGA or a combination of FPGA and a general-purpose processor.

An alternate configuration for geo-location that requires on-site or remote processing of data from multiple receivers front-end processing can be minimized. The FPGA simply performs basic base band conversion of the ADC data for selection of processing bandwidth and reduction of output data rate (this operation is called Digital Down Conversion or DDC). The baseband data can then be transferred via a network for further processing. The network can be a wireless network or a regular wired network. The DDC operation reduces the data rate based on the processing bandwidth before data transfer in order to bring the rate down to a manageable rate.

In one aspect, the present invention can be viewed as that of using radio receivers with simplified circuitry to receive radio signals. These radio signals are then sampled at a very high sampling rate. The sampled signals are then transmitted to a processing station (which may be physically remote from the radio receiver) for further processing. Without the need to process the radio signal at the receiver (i.e. no need to mix the signal), the receiver can be simple in design.

Figure 1A:
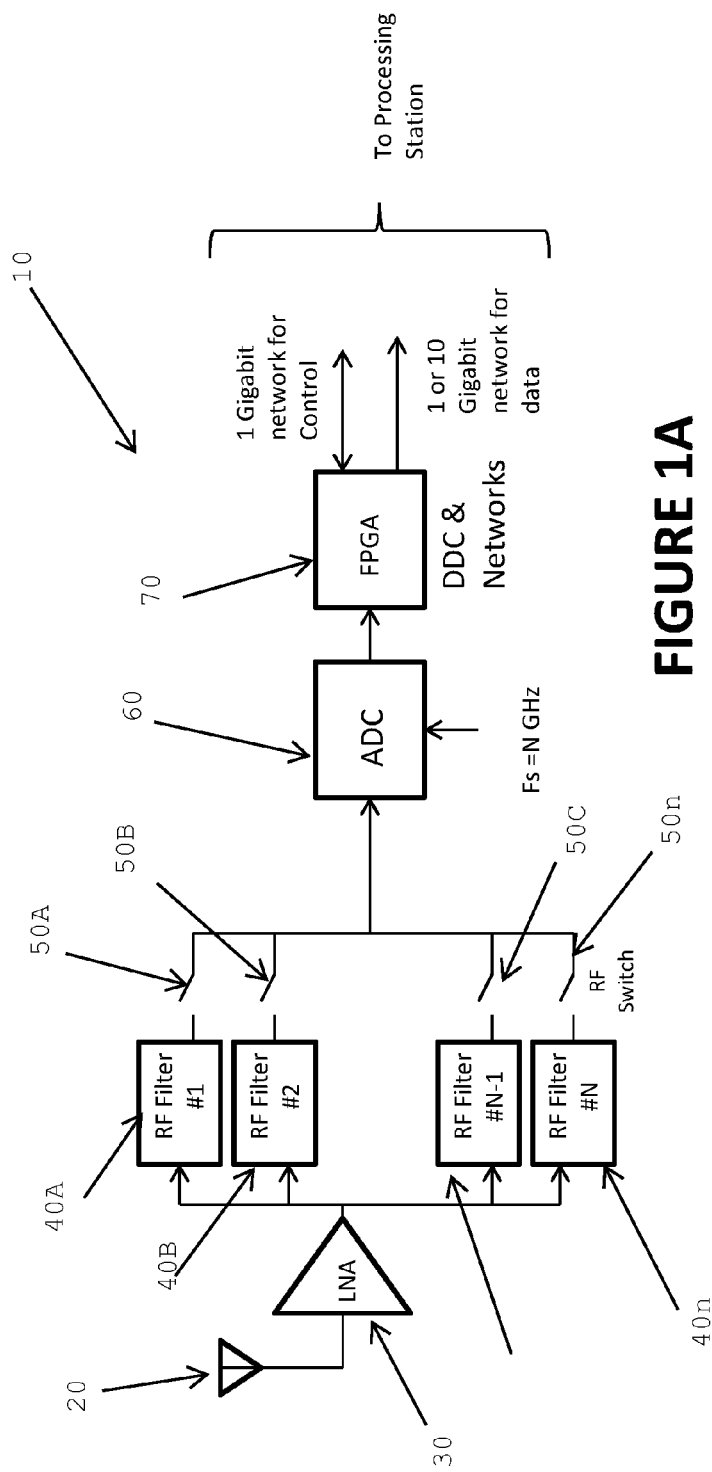
FIG. 1A is a simplified block diagram of a receiver configuration which uses 10 gigabit optical links.

In one configuration illustrated in FIG. 1A, the receiver performs data transfer functions via 10 gigabit optical links and control functions via 1 gigabit optical links. A 10 gigabit link can support data rates in excess of 1 GBytes/s and hence can reduce the front-end FPGA processing load. Alternatively, a 1 gigabit wireline or wireless interface can also be used for remote processing if some preprocessing, such as DDC, is performed to reduce the output data rate.

Referring to FIG. 1A, a block diagram of a receiver according to one aspect of the invention is provided. The receiver 10 receives wireless signals by way of an antenna and the signals are passed to a low noise amplifier 30. The amplifier output is then fed into RF filters 40A, 40B, . . . 40n. Each RF filter is coupled to a specific switch such that switches 50A, 50B, . . . 50n, when active, couples a specific RF filter to an A/D converter 60. The A/D converter (ADC) 60 samples or digitizes the incoming analog RF signal at rates of at least 1 giga sample per second (i.e. at rates of at least $1 \times 10^9$ samples per second). The resulting digitized RF signal can then be processed by FPGA (Field Programmable Gate Array) 70 (in one embodiment) or by sent by a digital network to a processing station. The digital links to the processing station is, preferably, capable of data transmission rates of anywhere from 1 to 10 Gbit/sec. In one embodiment, a 1 GByte/sec data connection is also present to send and receive control signals to and from a processing station. For lower bandwidth applications, a lower data throughput data link may be used to connect the receiver with the central processing station. As an example, a wireless data link may be used in place of a hardwired or fiber data link connecting the receiver with the central processing station.

In operation, the receiver 10 can filter the incoming analog signal to isolate the desired frequency band using one or more of the different RF filters 40A-40n. The signals from the isolated frequency band of interest is then digitized at a very high speed (at multiple gigasamples per second) and then processed by the FPGA 70 or transmitted for further processing by way of very high speed digital data network links. The central processing station may, using the high speed data network links or dedicated control signal links, control the behaviour of the receiver 10. This control may include controlling which switches are active such that specific RF filters are coupled to the ADC at specific times. As can be imagined, each one of the multiple RF filters isolates a specific predetermined frequency band. One alternative would be to have programmable RF filters such that the frequency bands isolated by each of the RF filters can be selected. The control signals for controlling the switches and the RF filters can originate with the central processing station by way of the control links.

As can be seen from FIG. 1A, the receiver does not require any complex down conversion circuitry or any other signal processing other than digitization. Processing of the incoming signals are performed on the digitized signal by either the FPGA 60 or at a processing center or, in some configurations, at both locations.

Figure 1B:
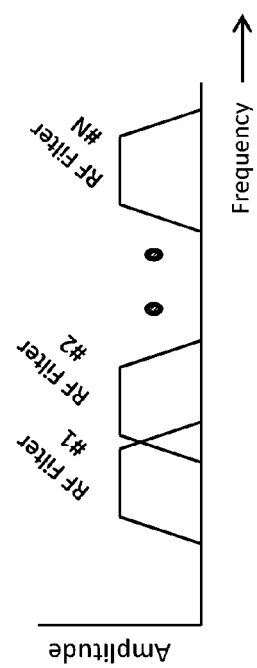
FIG. 1B illustrates example frequency responses of the various filters in FIG. 1.

FIG. 1B illustrates an example of the filter response of the various RF filters which are part of the receiver in FIG. 1A.

This architecture can provide:

Significant reduction of the complexity of the RF circuitry and hence better RF performances, high scan rate, lower cost, lower power & smaller size The architecture is particularly suitable for remote processing of multiple receivers For applications that require phase matching and clock synchronization, such as in radio geo-location, direction finding, beamforming, etc., the architecture offers:

Simplicity of the RF circuitry (having no mixing stages and local oscillators) makes it easier to phase and gain match multiple receivers;

The use of a very high speed sampling clocks (multiple GHz) means that since sample clock timing synchronization can only be off by, at most, sub-nanoseconds, the resulting geo-location error is small;

The above implies that if the each receiver is operated by its own independent stable clock (e.g, Rubidium), periodic clock-disciplining by GPS or other sources for sampling clock synchronization can be eliminated. Once the receivers are synchronized at a common site (using a common trigger) they can be physically separated for geo-location application without ever having to re-synchronize as long as power is maintained.

Figure 2:
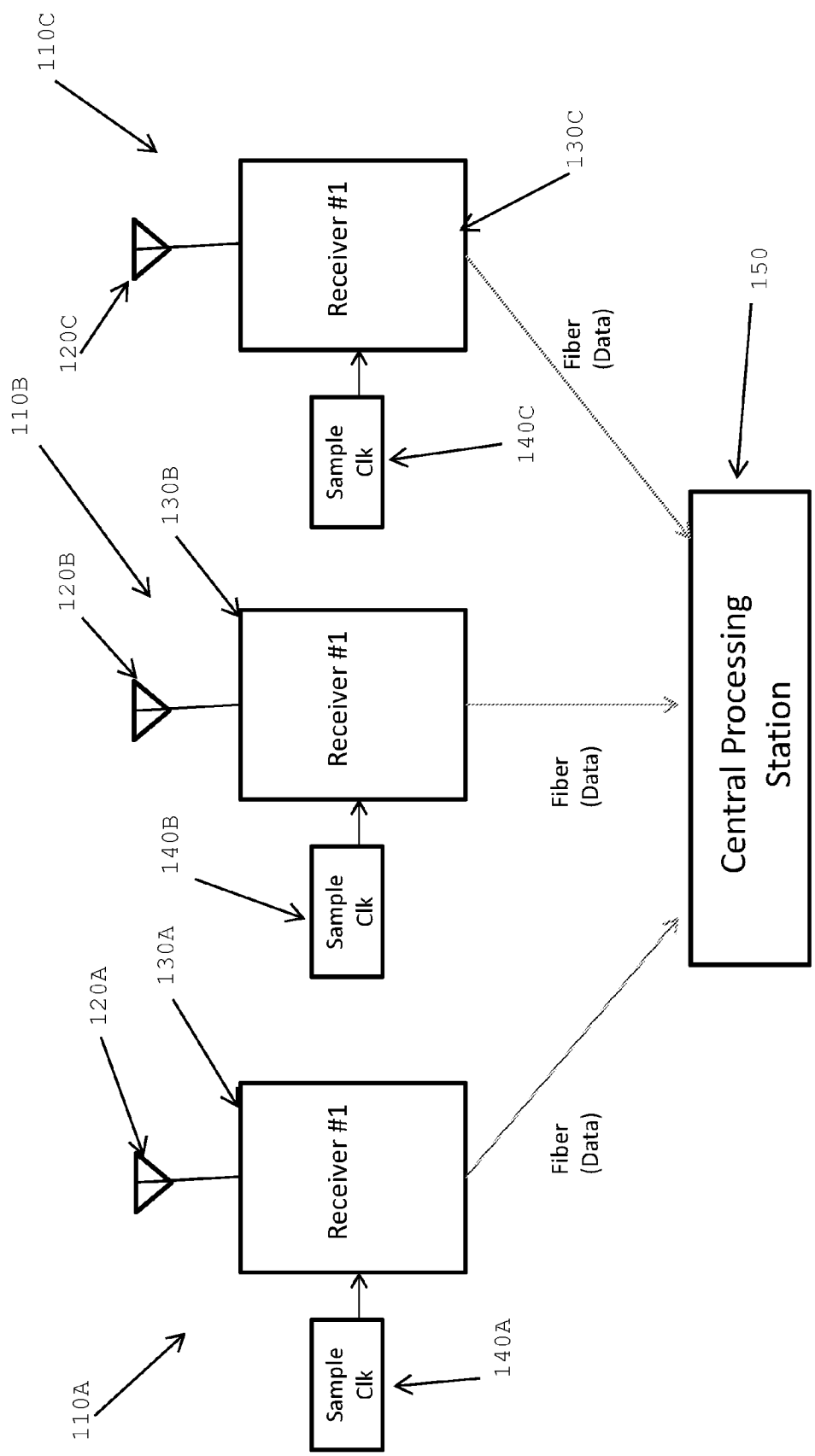
FIG. 2 is a simplified block diagram of a TDOA geo-location scheme according to one aspect of the invention.

FIG. 2 shows a simplified block diagram for a typical Time Difference of Arrival (TDOA) geo-location scheme using the said radio architecture. Each receiver system uses its own clock source. The configuration in the Figure uses 10 Gigabit fibers for data and 1 Gigabit fibers for control. Both being optical, the central processing station can be a long distance away. Each 10 Gigabit fiber (network) can provide data throughput rates in excess of 1 GByte/s. It is, therefore, possible to off-load all processing including the DDC function to the central processing station. In other words only raw ADC data is transferred to the central station. This further simplifies the receiver architecture.

Referring to FIG. 2, a block diagram of a larger system using the receiver configuration illustrated in FIG. 1 is presented. In one implementation, the system 100 in FIG. 2 is used for target geo-location. The system 100 has three receiver systems, each of which is similar to the configuration of receiver 10 in FIG. 1. In FIG. 2, each receiver system 110A, 110B, 110C has the same components. For simplicity, the following discussion will center on receiver system 110A but it should be clear that the other receiver systems 110B, 110C will have similar components and functions.

The receiver system 110A has an antenna 120A through which multiple wireless signals are received. The wireless signals are passed to receiver 130A. The receiver 130A filters the wireless signals to isolate the frequency band of interest and digitizes the isolated frequency band signal using an ADC (analog to digital converter). The analog to digital converter in receiver 130A is clocked by a sampling clock 140A which operates in the GHz range. As such, the sampling clocks 140A, 140B, 140C all operate at a very high clock rate. Once the frequency band of interest has been isolated and digitized by the receiver system 110A, the digitized wireless signal is transferred to a central processing station 150 for further processing. The central processing station 150 receives digitized wireless signals from all the receiver systems 110A, 110B, 110C. The wireless signals are received from each receiver system by way of an ultra-high speed data link. Preferably, each link between the central processing station and a receiver system is a dedicated high speed link. In one implementation, each link is a high speed fiber link capable of data transfer speeds of 1 GByte/sec and higher.

It should be noted that the different sampling clocks 140A, 140B, 140C should, preferably, be as synchronized as possible. Synchronization between the various sampling clocks allows for an easier implementation of a geo-location scheme. By having each of the different receiver systems intercept a wireless signal from a specific source, the central processing system can analyze the different times of arrival of the signal at the different receivers. The different times of arrival for the different receivers systems can then be used to triangulate and determine the location of the source of the wireless signal.

Since synchronizing differently located clocks can be difficult, one aspect of the invention relates to a method for ensuring multiple high speeds clocks are synchronized. In this aspect, the method involves locating all the clocks to be synchronized at a single physical location. The clocks are then synchronized with each other. This may involve turning on/activating the clocks simultaneously while they are all in the same physical location. Once the clocks have been simultaneously activated, the clocks should be synchronized. Any synchronization mismatch between the clocks should be, at most, one clock period or sub-nanoseconds, as the clock frequency is, typically, over 1 GHz. The synchronized clocks can now be allowed to operate on battery power and, while running, can be distributed to the various locations of the receiver systems. As can be imagined, the various receiver systems are preferably remotely located from one another. For best results in a geo-location application, the various receiver systems are preferably deployed at locations that are quite remote from one another.

It should be noted that the central processing station may be physically remote from the various receiver systems. As noted above, the high speed data links ensure that the digitized wireless signals are properly and quickly received by the central processing station. Depending on the configuration, the central processing station may be not be physically remote from one receiving station but is physically remote from the other receiving stations.

In one aspect, the invention provides a simple receiver architecture with no analog RF mixing stages. The receiver architecture uses electronically switched-in RF filters for instantaneous bandwidth selection and also offers very high speed spectrum scanning as a result of fast RF switching and very small RF settling time due to the simplicity of the RF stage. The receiver architecture also employs super high-speed ADC (in the order of giga ($1\times10^9$) samples per second) and FPGA based digital mixing and processing bandwidth selection and, if desired, all post processing. The receiver architecture may also use 1 Gigabit and/or 10 Gigabit optical or wireless networks to transfer baseband or raw ADC data for post-processing, either using an on-site facility or a remote facility.

The invention also provides a geo-location scheme based on the simple receiver concept. The geo-location scheme requires little or no RF calibration to match multiple receivers because of the simplicity of the RF stage. The same geo-location scheme requires no cumbersome and expensive clock disciplining procedure by GPS or other reference clock sources.

A person understanding this invention may now conceive of alternative structures and embodiments or variations of the above all of which are intended to fall within the scope of the invention as defined in the claims that follow.

We claim:

1. A method for synchronizing a plurality of radio frequency receivers, the method comprising:
   a) providing said plurality of radio frequency receivers, each one of said radio frequency receivers being equipped with an ultra high speed clock for clocking a reception of radio signals for said receivers, said receivers being for synchronizing with one another, said ultra-high speed clock having a frequency of at least one gigahertz;
   b) deploying each of said plurality of radio frequency receivers to a single physical location to thereby locate said plurality of radio frequency receivers at said single physical location;
   c) simultaneously activating said clocks of said plurality of radio frequency receivers using a common trigger to thereby synchronize said clocks of said plurality of radio frequency receivers to one another;
   d) placing each of said plurality of radio frequency receivers in hibernation such that each radio frequency receiver's clock is operational and continues its clocking;
   e) deploying each of said radio frequency receivers to different locations such that each of said radio frequency receivers is physically remote from each other;
   wherein said plurality of radio frequency receivers are used to determine a time of arrival of said radio signals.

2. The method according to claim 1 wherein each of said high speed clocks operates at a very high speed for directly digitizing RF signals.

3. The method according to claim 1 wherein each of said plurality of radio frequency receivers digitizes received wireless signals at a rate of at least $1\times10^9$ samples/sec.

4. A system for receiving multiple wireless signals, the system comprising:
   at least two radio frequency receivers for receiving said wireless signals and for digitizing wireless signals received, each of said at least two radio frequency receivers comprises an ultra-high speed clock for clocking digitization of said wireless signals, said ultra-high speed clock having a clock frequency of at least one gigahertz;

a central processing station controlling said at least two radio frequency receivers, said central processing station being physically remote from each of said at least two radio frequency receivers;

an ultra-high speed data link connecting said at least two radio frequency receivers and said central processing station;

wherein said at least two radio frequency receivers receive said wireless signals, digitizes said wireless signals, and sends digitized wireless signals to said central processing station by way of said data link;

said ultra-high speed clock is also used for clocking a reception of radio signals for said receivers and said receivers being for synchronizing with one another;

each of said at least two radio frequency receivers is devoid of down conversion circuitry and of signal mixing circuitry;

said ultra-high speed clock at each of said at least two radio frequency receivers synchronized with each other's ultra-high speed clock, said ultra-high speed clocks of said at least two radio frequency receivers being synchronized with each other by:
 a) deploying each of said ultra-high speed clocks to a single physical location,
 b) simultaneously activating said ultra-high speed clocks using a common trigger to thereby synchronize said ultra-high speed clocks with each other,
 c) placing each of said ultra-high speed clocks in hibernation and, after synchronizing with each other,
 d) deploying each of said ultra-high speed clocks to physical locations which are physically remote from one another;

said system being used to determine a time of arrival of said wireless signals.

5. The system according to claim 4 wherein said ultra-high speed data link transfers data at a rate of at least 1 Gbits/sec.

6. The system according to claim 5 wherein said ultra-high speed data link transfers data at a rate of at least 10 Gbits/sec.

7. The system according to claim 4 wherein each of said radio frequency receivers digitizes received wireless signals at a rate of at least $1 \times 10^9$ samples/sec.

8. The system according to claim 4 wherein said system is used in a geo-location scheme using time difference of arrival (TDOA).

9. The system according to claim 4 wherein each of said at least two radio frequency receivers are devoid of mixing stages.

10. The system according to claim 4 wherein each of said at least two radio frequency receivers are devoid of local oscillators for mixing analog RF signals.

11. The system according to claim 4 wherein at least one of said at least two radio frequency receivers comprises:

a low noise amplifier for amplifying wireless signals received by said radio frequency receiver to result in an amplified signal;

a plurality of RF filters for receiving and filtering said amplified signal, each of said RF filters being for filtering and isolating at least one frequency band of said amplified signal, each of said RF filters producing an isolated signal;

a high speed analog to digital converter (ADC) for digitizing an isolated signal from one of said plurality of RF filters to result in a digitized signal, said ADC being for digitizing said isolated signal at a sampling rate of at least $1 \times 10^9$ samples per second;

a plurality of switches for coupling said plurality of RF filters with said ADC, said plurality of switches being configured such that a specific RF filter is coupled to said ADC when a specific switch is active;

wherein said digitized signal from said ADC is transmitted to said central processing station by way of said ultra-high speed data link.

12. A receiver system for receiving wireless signals, the receiver comprising:

a low noise amplifier for amplifying wireless signals received by said receiver system to result in an amplified signal;

a plurality of RF filters for receiving and filtering said amplified signal, each of said RF filters being for filtering and isolating at least one frequency band of said amplified signal, each of said RF filters producing an isolated frequency band signal;

a high speed analog to digital converter (ADC) for digitizing an isolated signal from one of said plurality of RF filters to result in a digitized signal, said ADC being for digitizing said isolated signal at a sampling rate of at least $1 \times 10^9$ samples per second;

an ultra-high speed clock for clocking said ADC, said ultra-high speed clock having a clock speed of at least 1 gigahertz;

a plurality of switches for coupling said plurality of RF filters with said ADC, said plurality of switches being configured such that a specific RF filter is coupled to said ADC when a specific switch is active to thereby cause a specific frequency band of said amplified signal to be fed to said ADC;

wherein said digitized signal from said ADC is transmitted to a processing station by way of an ultra-high speed data link;

said receiver system is devoid of down conversion circuitry and of signal mixing circuitry;

said ultra-high speed clock is synchronized with other ultra-high speed clocks of other receiving systems using a method comprising:
 a) deploying each of said ultra-high speed clocks to a single physical location
 b) simultaneously activating said ultra-high speed clocks using a common trigger to thereby synchronize said ultra-high speed clocks with each other,
 c) placing each of said ultra-high speed clocks in hibernation and, after synchronizing with each other,
 d) deploying each of said ultra-high speed clocks to physical locations which are physically remote from one another.

13. The system according to claim 12 wherein said ultra-high speed data link transfers data at a rate of at least 1 Gbits/sec.

14. The system according to claim 12 wherein, for geo-location applications, said ultra-high speed clock is used to determine a time of arrival of said wireless signals.

15. The system according to claim 14 wherein said ultra-high speed clock is synchronized with ultra-high speed clocks of other receiver systems.

\* \* \* \* \*